United States Patent [19]

Itoh et al.

[11] 3,905,933

[45] Sept. 16, 1975

[54] STABILIZATION OF RIGID POLYVINYL CHLORIDE RESIN COMPOSITION

[75] Inventors: Yoshio Itoh, Yokohama; Yoshitoshi Itsukaichi, Kawasaki; Fumiaki Kuroi, Yokohama, all of Japan

[73] Assignee: Sankyo Organic Chemicals Co., Ltd., Kanagawa, Japan

[22] Filed: Jan. 4, 1974

[21] Appl. No.: 430,677

[52] U.S. Cl.... 260/31.6; 260/45.75 S; 260/45.75 T; 252/406
[51] Int. Cl.² ........................................... C08G 6/00
[58] Field of Search.. 260/45.75 S, 31.6 R, 45.75 T; 252/406, 408

[56] References Cited
UNITED STATES PATENTS

| | | | |
|---|---|---|---|
| 2,625,521 | 1/1953 | Fischer et al. | 260/45.75 |
| 3,075,940 | 1/1963 | Pazinski et al. | 260/45.95 |
| 3,640,947 | 2/1972 | Gloskey | 260/45.75 |

OTHER PUBLICATIONS

Kirk-Othmer Encyclopedia of Chemical Technology — Vol. 15, pp. 738, 751, 755, 782 and 783, 1969.

Modern Plastics Encyclopedia — 1965 — pp. 382 to 386.

Primary Examiner—V. P. Hoke
Attorney, Agent, or Firm—Flynn & Frishauf

[57] ABSTRACT

Stabilized rigid polyvinyl chloride resin composition and stabilizer therefor utilizing di-n-octyltin maleate and alkyl phthalyl alkyl glycolate. Di-n-octyltin bis(alkylthioglycolate) may be also incorporated therein.

16 Claims, No Drawings

STABILIZATION OF RIGID POLYVINYL CHLORIDE RESIN COMPOSITION

BACKGROUND OF THE INVENTION

1. Field of the Invention

This invention relates to a stabilized rigid polyvinyl chloride resin composition and a stabilizer to be involved in a rigid polyvinyl chloride resin. In particular, this invention relates to a rigid polyvinyl chloride resin composition having high transparency and excellent heat stability to be employed for packaging foodstuffs owing to its nontoxicity and odorlessness and further relates to a stabilizer to be involved in a rigid polyvinyl chloride resin in order to bring about such characteristics into the resin composition.

2. Description of the Prior Art

Heretofore, there have been employed a number of stabilizers, such as non-toxic calcium compounds, zinc compounds, magnesium compounds, epoxy compounds, organic esters of phosphorous acid, polyvalent alcohols, di-n-octyltin compounds, mono-alkyltin compounds and anti-oxidants as such or a mixture thereof, in the rigid polyvinyl chloride composition to be used for packaging foodstuffs. Yet, these stabilizers are not satisfactory because of the following defects.

A resin composition containing a mixture made of calcium compounds-zinc compounds and the like is not satisfactory owing to the fatal defect that the resin composition has an extremely low transparency and inferior heat stability. The non-toxic di-n-oxtyltin compounds are typically exemplified by di-n-octyltin bis (isooctylthioglycolate), di-n-octyltin maleate and the like. The di-n-octyltin bis(isooctylthioglycolate) can produce excellent transparency and heat stability but simultaneously brings an offensive odor into such a molded product as a film, sheet, container and the like. Consequently, said compound is not adequate as a stabilizer for a polyvinyl chloride resin for packaging foodstuffs. Di-n-octyltin maleate may be advantageous as a stabilizer for the polyvinyl chloride resin for packaging foodstuffs because it can produce excellent heat stability and gives little odor to the molded product such as film (refer to the complete specification of B. P. No. 1,252,491). Nevertheless, this compound gives less transparency and less initial heat stability, and further this compound is marketed in the form of fine power because the said solid melts at 90°–105°C and because of a better and easier dispersion into the polyvinyl chloride resin. Said fine powder was found to be disadvantageous in the mixing work, because the fine powder may readily blow away.

In addition, the use of di-n-octyltin bis(alkylthioglycolate) has been, heretofore, proposed in order to improve transparency and initial heat stability of di-n-octyltin maleate. However, in order to bring about enough transparency and initial heat stability, the di-n-octyltin bis(alkylthioglycolate) must be blended into di-n-octyltin maleate in an equal or greater amount of the former than the latter. Because the increase of the amount of di-n-octyltin bis(alkylthioglycolate) produces a stronger offensive odor, di-n-octyltin bis(alkylthioglycolate) to be used with di-n-octyltin maleate ought to be incorporated in a smaller amount. However, if di-n-octyltin bis(alkylthioglycolate) is incorporated in an equal or smaller amount than di-n-octyltin maleate, there can not be obtained enough transparency and initial heat stability.

SUMMARY OF THE INVENTION

Accordingly, it is an object of this invention to provide a stabilizer which can bring highly excellent transparency and initial heat stability as well as little odor into a rigid polyvinyl chloride resin composition. Another object of this invention is to provide a stabilized rigid polyvinyl chloride resin composition with highly excellent transparency and initial heat stability as well as little odor.

These and other objects of this invention have been attained by a stabilizer made by blending with heating (a) di-n-octyltin maleate (including di-n-octyltin maleate polymer; the following shall have the same meaning) having the formula (I) with alkyl phthalyl alkyl glycolate having the formula (II) or (b) di-n-octyltin maleate and di-n-octyltin bis(alkylthioglycolate) having the formula (III) in a smaller amount than said di-n-octyltin maleate with alkyl phthalyl alkyl glycolate, or a rigid polyvinyl chloride resin compositions comprising (a) di-n-octyltin maleate with alkyl phthalyl alkyl glycolate or (b) di-n-octyltin maleate and di-n-octyltin bis(alkylthioglycolate) in a smaller amount than said di-n-octyltin maleate with alkyl phthalyl alkyl glycolate.

Formula (I)

wherein $m$ is 2–4.

Formula (II)

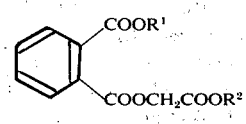

wherein $R^1$ and $R^2$ are the same or different and each represents an alkyl radical having carbon atoms of 1–4.

Formula (III)

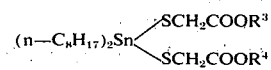

wherein $R^3$ and $R^4$ are the same or different and each represents an alkyl radical having carbon atoms of 1–12.

DETAILED DESCRIPTION OF THE PREFERRED EMBODIMENTS

In view of the state of the prior art as described before, the present inventors have made various studies and discovered that it is very useful to add alkyl phthalyl alkyl glycolate to an organotin stabilizer.

In case where the organotin stabilizer is di-n-octyltin maleate alone, an amount of alkyl phthalyl alkyl glycolate to be used may preferably be between about 0.2–5.0 parts by weight (on the basis of 100 parts by weight of the resin) and the maleate may preferably be between about 0.5–5.0 parts by weight (on the basis of 100 parts by weight of the resin). It is most preferably that alkyl phthalyl alkyl glycolate is employed in an amount of about 0.5–1.5 times by weight that of di-n-octyltin maleate. In case where di-n-octyltin maleate is employed together with di-n-octyltin bis(alkylthioglycolate), an amount of alkyl phthalyl alkyl glycolate to be used may preferably be in a range of about 0.1–4.0 parts by weight (on the basis of 100 parts by weight of the resin) and an amount of each di-n-octyltin maleate and di-n-octyltin bis(alkylthioglycolate) may preferably be in a range of about 0.5–3.0 parts by weight (on the basis of 100 parts by weight of the resin) in which the amount of di-n-octyltin bis(alkylthioglycolate) is always smaller than that of di-n-octyltin maleate. It is most preferred that alkyl phthalyl alkyl glycolate is employed in an amount of about 0.25–1.5 times by weight that of di-n-octyltin maleate. If the amount of di-n-octyltin bis-(alkylthioglycolate) is larger than that of di-n-octyltin maleate, the effect produced by the addition of alkyl phthalyl alkyl glycolate can not be observed.

As previously described, alkyl phthalyl alkyl glycolate can remarkably improve the transparency of polyvinyl chloride resin composition when it is employed together with di-n-octyltin maleate alone or both di-n-octyltin maleate and di-n-octyltin bis(alkylthioglycolate) in a smaller amount than di-n-octyltin maleate. However, the above-mentioned effect in the resin composition can hardly be produced if di-n-octyltin maleate is replaced by other organotin stabilizers such as, for example, di-n-butyltin maleate, di-n-butyltin bis(-monoalkylmaleate), di-n-octyltin bis(monoalkylmaleate) and the like. In addition, if a conventional plasticizer such as dibutyl phthalate, dioctyl phthalate or dioctyl adipate is employed in place of alkyl phthalyl alkyl glycolate, it can hardly improve the transparency of the polyvinyl chloride resin composition used.

Furthermore, the mixture, (a) di-n-octyltin maleate having the aforementioned formula (I) and alkyl phthalyl alkyl glycolate having the aforementioned formula (II) or (b) di-n-octyltin maleate of the formula (I), di-n-octyltin bis(alkylthioglycolate) of the formula (III) and alkyl phthalyl alkyl glycolate of the formula (II), is treated with heating to become a stabilizer which is capable of maintaining itself in a liquid state for a long period at room temperature. The stabilizer thus obtained is capable of bringing about an excellent transparency, a higher initial heat stability and little odor to the stabilized resin composition.

Di-n-octyltin maleate is a solid melting at 90°–105°C and is hardly soluble in a solvent which is usually employed in the art of the preparation of a wrapping for a foodstuff. Furthermore, in case where di-n-octyltin maleate is employed together with di-n-octyltin bis(alkylthioglycolate), the mixture is hardly liquefied because of lack of solubility of the former in the latter. In this regard, if di-n-octyltin bis(alkylthioglycolate) and di-n-octyltin maleate are mixed in a ratio of 2–3 to 1, the liquid is too viscous for handling. If the former is employed in an amount of an equal or smaller than the latter, the mixture obtained is not liquid but paste. However, alkyl phthalyl alkyl glycolate is added to the mixture and the mixture obtained blended with heating, the mixture turns into a transparent liquid having a low viscosity and a high stability. The amount needed for liquefying the stabilizer is as follows; if di-octyltin maleate alone is to be liquefied, alkyl phthalyl alkyl glycolate may be used in an amount of 1–1.5 times that of the maleate, and if both di-n-octyltin maleate and di-n-octyltin bis(alkylthioglycolate) in a ratio of more than about 60 weight percent of (the former) as against to less than about 40 weight percent (of the latter) are to be liquefied, alkyl phthalyl alkyl glycolate may be employed in an amount of about 0.25–1.0 times that of di-n-octyltin maleate. In the latter case, alkyl phthalyl alkyl glycolate of less than 0.25 times gives a higher viscosity to a one package type stabilizer and that of more than 1.0 time is not advantageous in view of physical properties and economy. A method of liquefying the mixture may be exemplified by blending with heating di-n-octyltin maleate and alkyl phthalyl alkyl glycolate or di-n-octyltin maleate, di-n-octyltin bis(alkylthioglycolate) and alkyl phthalyl alkyl glycolate at temperatures of 70–80°C for 1–2 hours until dissolved. In this dissolution process, such other inert solvents as benzene, toluene, and xylene may be present in the mixture. These solvents may be distilled off from the dissolved mixture. Such a method as one distilling off the solvent from the mixture which has been made by adding di-n-octyltin bis (alkylthioglycolate) and alkyl phthalyl alkyl glycolate to a solution of di-n-octyltin maleate freshly obtained by the reaction of maleic anhydride or maleic acid with di-n-octyltin oxide in the presence of an inert solvent without evaporation of the inert solvent may be employed as well. The latter two methods are more advantageous than the first one in the ease of dissolution and liquefying. In the liquefying processes, non-toxic additives such as an antioxidizing agent, epoxy compounds, organic ester of phosphorous acid, monoalkyltin compound and the like may be blended in the mixture.

The stabilizer thus obtained is generally employed in a ratio of 0.5–10 parts on the basis of 100 parts of a polyvinyl chloride resin each by weight. The stabilized resin composition has little odor and excellent transparency and initial heat stability.

The compound having the aforementioned formula (I) may be exemplified by di-n-octyltin maleate and di-n-octyltin maleate polymer. The compound having the aforementioned formula (II) may be exemplified by methyl phthalyl methyl glycolate, methyl phthalyl ethyl glycolate, ehtyl phthalyl ethyl glycolate and butyl phthalyl butyl glycolate. The compound having the aforementioned formula (III) may be exemplified by di-n-octyltin bis(butylthioglycolate, di-n-octyltin bis(hexylthioglycolate), di-n-octyltin bis(isooctylthioglycolate), di-n-octyltin bis(n-octylthioglycolate), di-n-octyltin bis(2-ethylhexylthioglycolate), di-n-octyltin bis(decylthioglycolate) and di-n-octyltin bis(laurylthioglycolate). The octylin compounds of the general formulae (I) and (III) may contain a small amount of other organic tin compounds, for instance, mono-n-octyltin compounds, tri-n-octyltin compound and di-iso-octyltin compound.

The polyvinyl chloride of the present invention may be exemplified by a polyvinyl chloride resin and copolymers of vinyl chloride such as, for instance, a vinyl chloride-vinyl acetate copolymer, vinyl chloride-vinyl ether copolymer, vinyl chloride-vinylidene chloride copolymer, vinyl chloride-propylene copolymer and vinyl chloride-ethylene-vinyl acetate copolymer. In addition, polymer blends of polyvinyl chloride with other polymer such as, for instance, an acrylonitrile-butadiene-styrene copolymer, methylmethacrylate-butadiene-styrene copolymer, styrene-acrylonitrile copolymer, acrylonitrile-butadiene copolymer, ethylene-vinyl copolymer and chlorinated polyethylene may be employed in this invention. The rigid polyvinyl-chloride resin composition may comprise a small amount of plasticizers and publicly known non-toxic stabilizers as well.

The present invention will be further illustrated by the following non-limitative examples. The term "part" means part by weight unless otherwise stated. The di-n-octyltin maleate employed therein has a degree of polymerization ($m$ in the formula (I)) of approximately 2.5.

EXAMPLE 1

| | |
|---|---|
| Polyvinyl chloride resin (Geon 103 EP-8: available from Nippon Zeon Co., Ltd., Japan) | 100 parts |
| Di-n-octyltin maleate | } 3.0 parts in the sum (as shown in Table I) |
| Di-n-octyltin bis(isooctylthioglycolate) | |
| Butylphthalyl butylglycolate | 0 or 3.0 parts |
| 2,6-Di-(tert-butyl)-4-methylphenol | 0.1 part |

The above mixture was kneaded at 175°C for 5 minutes by means of a test roller to form a sheet having a thickness of 0.5 mm. Some sheets were put together and molded at 180°C for 10 minutes into a test plate having the thickness of 6 mm. The obtained plate was measured of its turbidity by means of Turbidimeter ND-V type (available from Nippon Denshoku Kogyo Co., Ltd., Japan). Furthermore said plate was visually measured in its degree of coloration, which result was assumed to show initial heat stability. The degree of coloration was represented by the numeral set forth below.

| | |
|---|---|
| Almost colorless | 1 |
| Slightly yellow | 2 |
| Pale yellow | 3 |
| Yellow | 4 |

As is evident from the results set forth in Table I, the addition of butylphthalyl butylglycolate to mixture comprising di-n-octyltin maleate and di-n-octyltin bis(isooctylthioglycolate) in a smaller amount than the former, di-n-octyltin maleate, shows a prominent effect.

TABLE I

| No. | Stabilizer | Amount of Butylphthalyl butylglycolate | Turbidity (%) | Initial heat stability |
|---|---|---|---|---|
| 1 | DOTM 3.0 parts | 3.0 parts | 8.7 | 2 |
| 2 | DOTM 2.0 DOTB 1.0 | 3.0 | 6.5 | 1 |
| 3 | DOTM 1.7 DOTB 1.3 | 3.0 | 6.0 | 1 |
| 4 | DOTM 1.5 DOTB 1.5 | 3.0 | 7.5 | 1 |
| 5 | DOTM 1.3 DOTB 1.7 | 3.0 | 9.7 | 1 |
| 6 | DOTM 1.0 DOTB 2.0 | 3.0 | 10.5 | 1 |
| 7 | DOTM 0.5 DOTB 2.5 | 3.0 | 7.8 | 1 |
| 8 | DOTB 3.0 | 3.0 | 5.0 | 1 |
| 9 | DOTM 3.0 | 0 | 30.0 | 4 |
| 10 | DOTM 2.0 DOTB 1.0 | 0 | 22.5 | 4 |
| 11 | DOTM 1.7 DOTB 1.3 | 0 | 18.0 | 4 |
| 12 | DOTM 1.5 DOTB 1.5 | 0 | 16.0 | 3 |
| 13 | DOTM 1.3 DOTB 1.7 | 0 | 14.0 | 2 |
| 14 | DOTM 1.0 DOTB 2.0 | 0 | 10.5 | 2 |
| 15 | DOTM 0.5 DOTB 2.5 | 0 | 7.8 | 2 |
| 16 | DOTB 3.0 | 0 | 5.5 | 1 |

Note)

TABLE I-Continued

| No. | Stabilizer | Amount of Butylphthalyl butylglycolate | Turbidity (%) | Initial heat stability |
|---|---|---|---|---|

DOTM: Di-n-octyltin maleate
DOTB: Di-n-octyltin bis(isooctylthioglycolate)

In this example, Samples Nos. 4 to 16 were prepared and measured for comparison.

EXAMPLE 2

A mixture prepared by mixing 100 parts of the polyvinyl chloride resin (Geon 103 EP-8), 0.1 part of 2,6-di-tert-butyl-4-methylphenol and in certain amounts of di-n-octyltin maleate, di-n-octyltin bis(isooctylthioglycolate) and butylphthalyl butylglycolate set forth in Table II was molded into a test plate having the thickness of 6 mm in the same manner as in Example 1. The obtained plate was measured in its turbidity and initial heat stability.

The results are set forth in Table II. From Table II, the effective amount of butylphthalyl butylglycolate can be seen.

TABLE II

| No. | Stabilizer | Amount of Butylphthalyl butylglycolate | Turbidity (%) | Initial heat stability |
|---|---|---|---|---|
| 17 | DOTM 3.0 parts | 0 parts | 31.5 | 4 |
| 18 | Do. | 1.0 | 22.0 | 2 |
| 19 | Do. | 1.5 | 19.3 | 2 |
| 20 | Do. | 2.0 | 15.5 | 2 |
| 21 | Do. | 3.0 | 10.0 | 2 |
| 22 | Do. | 5.0 | 6.0 | 1 |
| 23 | Do. | 7.0 | 6.5 | 1 |
| 24 | Do. | 10.0 | 6.0 | 1 |
| 25 | DOTM 1.7 DOTB 1.3 | 0 | 19.5 | 4 |
| 26 | Do. | 0.5 | 14.5 | 1 |
| 27 | Do. | 1.0 | 12.0 | 1 |
| 28 | Do. | 1.5 | 10.0 | 1 |
| 29 | Do. | 2.0 | 9.0 | 1 |
| 30 | Do. | 3.0 | 8.5 | 1 |

Note)
DOTM: Di-n-octyltin maleate
DOTB: Di-n-octyltin bis(isooctylthioglycolate)

In this example, Samples Nos. 17 and 25 were prepared and measured for purposes of comparison.

EXAMPLE 3

A mixture prepared by mixing 100 parts of the polyvinyl chloride resin (Geon 103 EP-8), 0.1 part of 2,6-di-(tertbutyl)-4-methylphenol, 2.0 parts of di-n-octyltin maleate, 1.0 part of di-n-octyltin bis(isooctylthioglycolate) and 3.0 parts of alkylphthalyl alkylglycolate or a usual plasticizer for purposes of comparison instead of said alkylphthalyl alkylglycolate set forth in Table III was molded into a test plate having the thickness of 6 mm in the same manner as in Example 1. The obtained plate was measured in its turbidity and initial heat stability.

The results are set forth in Table III. It can be seen from Table III that alkylphthalyl alkylglycolate is very effective and, in contrast, the usual plasticizers such as dibutyl phthalate, dioctyl phthalate and dioctyl adipate are almost ineffective.

TABLE III

| No. | Stabilizer and/or Additive | parts | Turbidity (%) | Initial heat stability |
|---|---|---|---|---|
| 31 | DOTM | 2.0 | 23.0 | 4 |
|    | DOTB | 1.0 | | |
| 32 | DOTM | 2.0 | 7.3 | 1 |
|    | DOTB | 1.0 | | |
|    | Methylphthalyl methylglycolate | 3.0 | | |
| 33 | DOTM | 2.0 | 7.8 | 1 |
|    | DOTB | 1.0 | | |
|    | Ethylphthalyl ethylglycolate | 3.0 | | |
| 34 | DOTM | 2.0 | 7.5 | 1 |
|    | DOTB | 1.0 | | |
|    | Butylphthalyl butylglycolate | 3.0 | | |
| 35 | DOTM | 2.0 | 23.2 | 4 |
|    | DOTB | 1.0 | | |
|    | Dibutyl phthalate | 3.0 | | |
| 36 | DOTM | 2.0 | 22.5 | 4 |
|    | DOTB | 1.0 | | |
|    | Dioctyl phthalate | 3.0 | | |
| 37 | DOTM | 2.0 | 23.0 | 4 |
|    | DOTB | 1.0 | | |
|    | Dioctyl adipate | 3.0 | | |

Note)
DOTM: Di-n-octyltin maleate
DOTB: Di-n-octyltin bis(isooctylthioglycolate)

In this example, Samples Nos. 31, 35, 36 and 37 were prepared and measured for purposes of comparison.

EXAMPLE 4

Into a four-neck flask (200 ml) equipped with a thermometer, a cooler and a stirrer were charged 50 g of di-n-octyltin maleate, 25 g of di-n-octyltin bis(isooctylthioglycolate) and 25 g of methylphthalyl methylglycolate. The mixture was gradually heated with stirring to a temperature of 70°–80°C and was further stirred for 2 hours at said temperature until dissolved. Transparent pale-yellowish oil being stable at room temperature for a long period was obtained.

EXAMPLE 5

Into a four-neck flask (500 ml) equipped with a thermometer, a cooler and a stirrer were charged 50 g of di-n-octyltin maleate, 25 g of di-n-octyltin bis(2-ethylhexylthioglycolate), 25 g of butylphthalyl butylglycolate and 100 g of toluene. The mixture was gradually heated with stirring to a temperature of 70°–80°C and was further stirred at said temperature until dissolved into a transparent liquid. Upon evaporation of toluene, transparent pale-yellowish oil was obtained.

EXAMPLE 6

Into a four-neck flask (500 ml) equipped with a thermometer, a cooler and a stirrer were charged 60 g of toluene and 21.3 g of maleic anhydride. The mixture was gradually heated with stirring to 60°C so that maleic anhydride was dissolved. When maleic anhydride dissolved, the temperature of the liquid was lowered to 40°C. Into the liquid was subsequently charged 79 g of di-n-octyltin oxide, and then the mixture was stirred at 40°C for 30 minutes. Subsequently, the temperature of the mixture was gradually elevated to 60°C. When the reaction mixture turned transparent, 50 g of di-n-octyltin bis(isooctylthioglycolate) and 50 g of ethylphthalyl ethylglycolate were added thereto, and the resultant was stirred well. Upon distilling toluene off the reaction mixture, there was obtained a transparent and pale-yellowish oil.

EXAMPLE 7

Into a four-neck flask (200 ml) equipped with a thermometer, a cooler and a stirrer were charged 50 g of di-n-octyltin maleate and 50 g of buthylphthalyl butyl glycolate. The mixture was gradually heated with stirring to a temperature of 70°–80°C. At this temperature, the mixture was stirred for 2 hours until dissolved. There was obtained at room temperature a transparent and pale-yellowish oil.

The following experiments were made in order to evaluate capabilities of the stabilizers obtained in Examples 4, 5, 6 and 7.

EXAMPLE 8

| | |
|---|---|
| Polyvinyl chloride resin (Geon 103EP-8) | 100 parts |
| Stabilizer | as shown in Table IV |
| 2,6-Di(tert-butyl)-4-methylphenol | 0.1 part |

The above mixture was kneaded at 180°C for 5 minutes by means of a test roller into a sheet having a thickness of 0.5 mm. Some sheets were put together and molded at 180°C for 10 minutes into a test plate having the thickness of 6 mm. The obtained plate was measured in the same manner as in Example 1. Furthermore, the initial heat stability of the plate was visually evaluated based on a degree of coloration thereof. The degree of coloration was represented in the same manner as in Example 1.

TABLE IV

| No. | Stabilizer and/or Additive | Amount (part) | Amount as converted to lead (part) | Turbidity (%) | Initial heat stability |
|---|---|---|---|---|---|
| 38 | Compound as obtained in Example 4 | 3.75 | 0.67 | 7.0 | 1 |
| 39 | Compound as obtained in Example 5 | 3.75 | 0.67 | 7.3 | 1 |
| 40 | Compound as obtained in Example 6 | 3.75 | 0.67 | 6.8 | 1 |
| 41 | Compound as obtained in Example 7 | 5.28 | 0.67 | 10.6 | 2 |
| 42 | DOTM / DOTB | 2.0 / 1.0 | 0.67 | 23.3 | 4 |
| 43 | DOTB | 4.24 | 0.67 | 6.5 | 1 |
| 44 | DOTM | 2.64 | 0.67 | 29.5 | 4 |

Note)
DOTM: Di-n-octyltin maleate
DOTB: Di-n-octyltin bis(isooctylthioglycolate)

In this example, Samples Nos. 42–44 were prepared and measured for purposes of comparison.

As is seen from Table IV, comparison of Samples Nos. 38, 39 and 40 with Sample No. 42 revealed that the stabilizers of this invention have both highly excellent initial heat stabilizing effect and extremely excellent transparency being as good as that of Sample No. 43.

In addition, comparison of Sample No. 41 and Sample No. 44 shows that Sample No. 41 according to this invention is improved in an initial heat stability and transparency.

What is claimed is:

1. A stabilized rigid polyvinyl chloride resin composition which comprises a polyvinyl chloride resin and a mixture selected from the group consisting of
   a. a mixture of di-n-octyltin maleate having the formula (I):

$$[(n\text{---}C_8H_{17})_2SnOCOCH=CHCOO]_m \quad (I)$$

wherein $m$ is 2–4,
   and alkyl phthalyl alkyl glycolate having the formula (II):

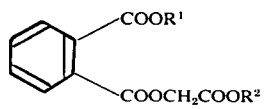

wherein $R^1$ $R^2$ are the same or different and each represents an alkyl radical having carbon atoms of 1–4,
   in an amount of 0.5–1.5 times by weight that of the di-n-octyltin maleate and
   b. a mixture of di-n-octyltin maleate having the formula (I), di-n-octyltin bis(alkylthioglycolate) having the formula (III):

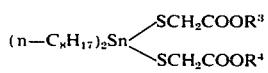

wherein $R^3$ and $R^4$ are the same or different and each represents an alkyl radical having carbon atoms of 1–12.
   in a smaller amount than the di-n-octyltin maleate, and alkyl phthalyl alkyl glycolate having the formula (II) in an amount of 025.–1.5 times by weight the sum of both the di-n-octyltin maleate and di-n-octyltin bis(alkylthioglycolate), in which composition the said mixture is incorporated in a ratio of 0.-5–10.0 weight parts to 100 weight parts of a rigid polyvinyl chloride resin employed.

2. The stabilized rigid polyvinyl chloride resin composition as claimed in claim 1 in which the mixture consisting of di-n-octyltin maleate having the formula (I) and alkyl phthalyl alkyl glycolate having the formula (II) is used.

3. The stabilized rigid polyvinyl chloride resin composition as claimed in claim 1 in which the mixture consisting of di-n-octyltin maleate having the formula (I), di-n-octyltin bis(alkylthioglycolate) having the formula (III) and alkyl phthalyl alkyl glycolate having the formula (II) is used.

4. The stabilized rigid polyvinyl chloride resin composition as claimed in claim 1 in which the alkyl phthalyl alkyl glycolate is selected from the group consisting of methyl phthalyl methyl glycolate, ethyl phthalyl ethyl glycolate and butyl phthalyl butyl glycolate.

5. The stabilized rigid polyvinyl chloride resin composition as claimed in claim 3 in which the di-n-octyltin bis(alkylthioglycolate) is selected from the group consisting of di-n-octyltin bis(isooctylthioglycolate) and di-n-octyltin bis(2-ethylhexylthioglycolate).

6. The stabilized rigid polyvinyl chloride resin composition as claimed in claim 1 in which $m$ in the formula (I) is approximately 2.5

7. The stabilized rigid polyvinyl chloride resin composition as claimed in claim 1 which further comprises nontoxic additives selected from the group consisting of an antioxidizing agent, epoxy compound, organic ester of phosphorous acid and monoalkyltin compound.

8. The stabilized rigid polyvinyl chloride resin composition as claimed in claim 3 in which an ratio of di-n-octyltin maleate and di-n-octyltin bis(alkylthioglycolate) is more than about 60 weight percent of the maleate to less than about 40 weight percent of the alkylthioglycolate.

9. A stabilizer for the use of stabilizing a rigid polyvinyl chloride resin composition which is obtained by mixing with heating a compound selected from the group consisting of
   a. a compound of di-n-octyltin maleate having the formula (I):

$$](n\text{---}C_8H_{17})_2SnOCOCH=CHCOO]_m \quad (I)$$

wherein $m$ is 2–4,
   and alkyl phthalyl alkyl glycolate having the formula (II):

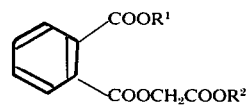

wherein $R^1$ and $R^2$ are the same or different and each represents an alkyl radical having carbon atoms of 1–4,
   in an amount of 0.5–1.5 times by weight that of the di-n-octyltin maleate and
   b. a compound of di-n-octyltin maleate having the formula (I), di-n-octyltin bis(alkylthioglycolate) having the formula (III):

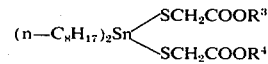

wherein $R^3$ and $R^4$ are the same or different and each represents an alkyl radical having carbon atoms of 1–12.
   in a smaller amount than the di-n-octyltin maleate and alkyl phthalyl alkyl glycolate having the formula (II) in an amount of 0.25–1.5 times by weight the sum of both the di-n-octylin maleate, and di-n-octylin bis(alkylthioglycolate).

10. The stabilizer as claimed in claim 9 in which the compound consisting of di-n-octyltin maleate having the formula (I) and alkyl phthalyl alkyl glycolate having the formula (II) is used.

11. The stabilizer as claimed in claim 9 in which the compound consisting of di-n-octyltin maleate having the formula (I), di-n-octyltin bis(alkylthioglycolate) having the formula (III) and alkyl phthalyl alkyl glycolate having the formula (II) is used.

12. The stabilizer as claimed in claim 9 in which the alkyl phthalyl alkyl glycolate is selected from the group consisting of methyl phthalyl methyl glycolate, ethyl phthalyl ethyl glycolate and butyl phthalyl butyl glycolate.

13. The stabilizer as claimed in claim 11 in which the di-n-octyltin bis(alkylthioglycolate) is selected from the group consisting of di-n-octyltin bis(isooctylthioglycolate) and di-n-octyltin bis(2-ethylhexylthioglycolate).

14. The stabilizer as claimed in claim 9 in which $m$ in the formula (I) is approximately 2.5

15. The stabilizer as claimed in claim 9 in which the compound further comprises non-toxic additives selected from the group consisting of an antioxidizing agent, epoxy compound, organic ester of phosphorous acid and monoalkyltin compound.

16. The stabilizer as claimed in claim 11 in which an ratio of di-n-octyltin maleate and di-n-octyltin bis(alkylthioglycolate) is more than about 60 weight percent of the maleate to less than about 40 weight percent of the alkylthioglycolate.

* * * * *

UNITED STATES PATENT AND TRADEMARK OFFICE
CERTIFICATE OF CORRECTION

PATENT NO. : 3,905,933
DATED : September 16, 1975
INVENTOR(S) : YOSHIO ITOH et al It is certified that error appears in the above–identified patent and that said Letters Patent are hereby corrected as shown below:

Column 2, line 60: replace "preferably" with --- preferable ---.

Column 3, line 63: after "against", delete "to".

Column 4, line 38: replace "ehtyl" with --- ethyl ---.

Column 5, Table 1, No. 2: after "DOTB", recite "1.0" under "2.0" rather than under "3.0".

Column 6, line 46, under "Note)": after "DOTB", replace "...(isoctylthioglycolate)" with --- ...(isooctylthioglycolate) ---.

Column 9, line 38, Claim 1: replace "025." with --- 0.25 ---.

Column 10, line 20: replace "]" (first occurrence) with --- [ ---.

Column 10, line 49, Claim 9: after "maleate", insert a comma (",").

Signed and Sealed this ninth Day of March 1976

[SEAL]

Attest:

RUTH C. MASON
Attesting Officer

C. MARSHALL DANN
Commissioner of Patents and Trademarks